United States Patent Office 3,549,745
Patented Dec. 22, 1970

3,549,745
TERTIARY ALPHA-NAPHTHYLAMINES
Haydn Geoffrey Dickenson, Chesham, Colin David Granger, Wembley, Greater London, Peter Nicholl Green, Pinner, Greater London, William Kelly, Liverpool, and Hastings Wang, Halewood, near Liverpool, England, assignors to Ward Blenkinsop & Company Limited, Wembley, Greater London, England, a British company
No Drawing. Filed May 18, 1967, Ser. No. 639,308
Claims priority, application Great Britain, May 20, 1966, 22,697/66
Int. Cl. C07c 93/14
U.S. Cl. 260—574  8 Claims

ABSTRACT OF THE DISCLOSURE

Alkyl ethers of tertiary alpha-naphthylamines are described having the formula

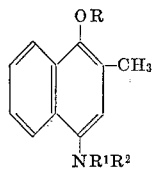

in which R is an alkyl group having one to six carbon atoms, e.g. a methyl group, and each of $R^1$ and $R^2$ is a haloalkyl group having the formula —$C_nH_{2n}X$ in which $n$ is 2, 3 or 4 and X is a chlorine or bromine atom present on a carbon atom other than that which is linked to nitrogen, e.g. a beta-chloroethyl group. The compounds are shown to exert a selective reduction in the lymphocytes in the blood of rats and dogs and to have a high therapeutic index. Suitable pharmaceutical formulations of the compounds are also described.

---

This invention relates to tertiary alpha-naphthylamines and the production thereof.

The invention provides a tertiary alpha-naphthylamine having the general formula

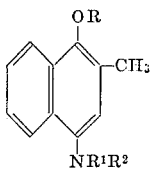

in which R is an alkyl group having one to six carbon atoms, and each of $R^1$ and $R^2$ is a haloalkyl group having the formula —$C_nH_{2n}X$ in which $n$ is 2, 3 or 4 and X is a chlorine or bromine atom present as a substituent on a carbon atom other than that which is linked to the nitrogen atom. $R^1$ and $R^2$ may be like or unlike. It is preferred that in at least one of $R^1$ and $R^2$ a chlorine or bromine atom is present in the beta-position with respect to the nitrogen atom.

According to a feature of the present invention compounds having the above general formula may be prepared by a process which comprises treating a dialkanolamine having the general formula

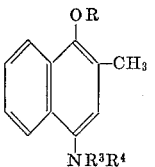

in which R is defined above and each of $R^3$ and $R^4$ is an alkylol group having 2, 3 or 4 carbon atoms in which the hydroxyl substituent is present on a carbon atom other than that which is linked to the nitrogen atom, with a halogenating agent which acts as a source of chlorine or bromine. Suitable halogenating agents include phosphorus trichloride and tribromide, phosphorus pentachloride and pentabromide, phosphoryl chloride and bromide and thionyl chloride and bromide.

The dialkanolamines having the above general formula may be produced by the action of one or two alkylolating agents upon the corresponding primary amines having the general formula

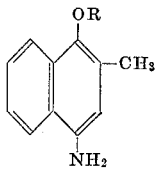

in which R is as above defined. The most convenient alkylolating agents are the alkylene chlorohydrins and bromohydrins having two to four carbon atoms such as ethylene chloro- and bromo-hydrins, propylene chlorohydrin and butylene alphachlorohydrin.

Alternatively both alkylol groups may be introduced by reacting the corresponding amine with two molar proportions of ethylene, propylene or butylene oxide. Not more than a slight excess of alkylene oxide should be used when proceeding in this way.

The primary amines having the last general formula given above are obtainable from 1-hydroxy-2-methyl-4-aminonaphthalene by acylation, e.g. with acetic anhydride, to produce 1-hydroxy-2-methyl-4-acetylamidonaphthalene, alkylation with an alkylating agent such as a dialkyl sulphate or alkyl halide having up to six carbon atoms in the alkyl group or in each alkyl group, e.g. to produce 1-methoxy-2-methyl - 4 - acetylamido-naphthalene with dimethyl sulphate is used as the alkylating agent, followed by hydrolysis of the acyl group to give the corresponding 1-alkoxy-2-methyl-4-aminonaphthalene which is normally isolated in the form of a salt thereof with an acid such as the hydrochloride or hydrobromide.

The alkylating agents employed include ethylene chlorohydrin and bromohydrin, epichlorohydrin, gamma-hydroxy-n-propyl chloride and beta-hydroxy-n-butyl chloride and bromide.

To produce the compounds of the invention from the abovementioned acid salts, the selected salt may be dissolved in a suitable solvent, such as water, and an acid acceptor, e.g. sodium bicarbonate or calcium carbonate, gradually added thereto. This liberates the corresponding free base to which the alkylolating agent or agents are then added. Alternatively, the selected acid salt and the alkylolating agent may be present in the same solution and the acid acceptor added thereto. At least two moles of alkylolating agent should be used for each mole of 1-alkoxy-2-methyl-4-amino-naphthalene employed: preferably at least 10% excess of the alkylolating agent is present. The solution of alkylolating agent and 1-alkoxy-2-methyl-4-amino-naphthalene is then heated for a sufficient time to bring about introduction of two alkylol groups upon the amino-nitrogen atom. Such compounds may be readily isolated from the solution in which they have been prepared by making use of their ready solubility in normally liquid alkanols which are only sparingly soluble or insoluble in water, e.g. n-butanol and the pentanols. This effects a separation from unchanged alkylolating agent, the partition coefficient of which latter favours the aqueous phase. The amine may then be isolated from solution in the alkanol in the form of salt with an acid by reaction with an inorganic acid such as a hydrogen halide or with an organic acid such as acetic, lactic or fumaric acid.

The thus produced N,N-bis(hydroxyalkyl)-1-alkoxy-2-methyl-4-amino-naphthalenes are then reacted with a suitable halogenating agent in order to replace the hydroxyl groups by chlorine or bromine atoms. The halogenating agent is used in an amount which is sufficient to replace the hydroxyl groups in both alkylol groups by halogen atoms and the product is isolated and worked up in any convenient manner depending upon the nature of the halogenating agent used. It is preferred to heat the reactants in order to complete the reaction. The halogenating agent may be a chloride or bromine of an inorganic acid such as phosphoryl chloride or bromide, a phosphorus chloride or bromide such as phosphorus trichloride or thionyl chloride or bromide. The resulting reaction mixtures may then be decomposed with iced water and the product isolated therefrom.

The products of the invention are of pharmacological interest in the treatment of lymphosarcomas, forms of carcinoma and forms of leukemia. Of particular importance is the high therapeutic index of the compound of Example 1, i.e. the ratio of the $LD_{50}$ value to the $ID_{90}$ value.

In the case of mice the $LD_{50}$ value was determined upon female mice each weighing 20–26 gms. When administered intraperitoneally in solution in arachis oil using a single injection the value was found to be 460 mg./kg. body weight. A similar determination in Wistar rats by the same route gave the value 240 mg./kg. body weight.

In the case of mice the $ID_{90}$ value (dosage giving 90% inhibition of a tumour) was determined on female mice in which a plasma cell tumour had been implanted ten days prior to the administration of a solution of the compound of Example 1 in arachis oil: the value determined was 40 mg./kg. body weight. Thus the therapeutic index in the case of mice was 11.5. A similar determination upon Wistar rats using a form of Yoshida sarcoma also gave an $ID_{90}$ value of 40 mg./kg. body weight corresponding to a therapeutic index of 6.

An examination was also made of the alterations brought about in the white blood cell counts of female rats to which a single dose of 200 mg./kg. body weight of the compound of Example 1 was given orally as a fine suspension in a mucilage of gum tragacanth. A blood count was taken before treatment and counts of the polymorphs and of the lymphocytes were taken three days after the administration of the dose. In the following table data are presented for the percentage fall in total cell counts and in polymorphs and lymphocytes for six female rats.

TABLE 1

| Rat | Percent fall in blood count | | |
|---|---|---|---|
| | Total | Polymorphs | Lymphocytes |
| 1 | 68.2 | 63.1 | 72.2 |
| 2 | 54.2 | 35.1 | 60.3 |
| 3 | 42.4 | | 71.0 |
| 4 | 61.4 | 13.8 | 73.3 |
| 5 | 77.1 | 65.2 | 83.0 |
| 6 | 72.4 | 21.2 | 82.8 |
| Mean | 62.6 | 39.7 | 73.8 |
| Standard error | ±5.03 | ±2.54 | ±3.46 |

The results set forth above reveal that there is a very marked, and in most cases, selective reduction in the lymphocytes present in the blood three days after administering the compound. It was therefore decided to make further experiments with dogs which were submitted to a daily dosage of the compound of Example 1 at different dosage levels. Blood from each dog was submitted to examination to determine the total white cell count whilst separate counts of the lymphocytes, polymorphs and platelets were also taken. The results are set out in Table 2.

TABLE 2

| Day | Total white count ×10³ | Lymphocytes ×10³ | Polymorphs ×10³ | Platelets ×10⁵ |
|---|---|---|---|---|
| Dog No. 310—male, daily dose 10 mg./kg. | | | | |
| 0 | 10–13 | 2–4 | 7–10 | 4–5 |
| 11 | 9 | 1.35 | 7.6 | 4.75 |
| 16 | 6.7 | 0.81 | 6 | 5 |
| Dog No. 311—female, daily dose 15 mg./kg. | | | | |
| 0 | 9–14 | 2–4 | 6–11 | 2–3.5 |
| 7 | 10.5 | 0.682 | 10 | |
| 11 | 5.5 | 0.22 | 5.3 | 2.6 |
| Dog No. 312—male, daily dose 20 mg./kg. | | | | |
| 0 | 10–15 | 2–4 | 8–11 | 3.5 |
| 7 | 6.5 | 0.455 | 6 | 3 |
| 11 | 8.2 | 0.82 | 7 | 5 |
| 16 | 7.8 | 0.156 | 7 | 2.7 |

The results given in Table 2 show an even more marked selective reduction in the proportion of lymphocytes present in dogs' blood of either sex especially when the daily dosage was at the rate of at least 15 mg./kg. body weight. Moreover these results indicate that the compound under test is potentially valuable in the treatment of lymphatic leukemia and in the treatment of auto-immune diseases and in preventing the rejection of homografts: in all of these conditions it is believed that the lymphocytes act as carriers, e.g. for the antibodies responsible for auto-immune diseases.

The following examples illustrate the production of the compounds of the invention.

EXAMPLE 1

Calcium carbonate (13 grams) was gradually added to a mixture of 4-amino-1-methoxy-2-methyl-naphthalene hydrochloride (11.7 grams), ethylene chlorohydrin (25 grams) and water (50 cc.). The mixture was stirred and boiled under reflux for 30 hours, then cooled, diluted with n-butanol and filtered. The n-butanol layer of the filtrate was separated, washed with water, and dried by distilling until no more water distilled over. The n-butanol solution of N,N - bis(beta - hydroxyethyl)-1-methoxy-2-methyl-4-amino-naphthalene thus obtained was saturated with dry hydrogen chloride whilst stirring. The solid hydrochloride which separated was filtered, washed with n-butanol, and dried. Yield 10 grams (61%). The hydrochloride has melting point 157–159° C. and an assay, by non-aqueous titration of 100.6%.

The hydrochloride of the bis(beta-hydroxyethyl) compound prepared as described above (9.35 grams) and phosphorus oxychloride (10.1 grams) were heated on a steam bath under reflux for one hour. The reaction mixture was cooled, poured into a mixture of ice and water and the resulting oil extracted with benzene. The benzene extract was washed with water, dried over anhydrous sodium sulphate and passed downwardly through a short column of alumina. Benzene was removed from the thus treated solution by evaporation and the residual oil crystallised from light petroleum (boiling point 60–80° C.). Yield 6 grams (64%). The N,N-bis(beta-chloroethyl)-1 methoxy-2-methyl-4-amino-naphthalene thus obtained has melting point 58–59° C. and contains 0.2% by weight of moisture.

*Analysis.*—Calculated for $C_{16}H_{19}NOCl_2$ (percent): Cl, 22.68; N, 4.48. Found (percent): Cl, 22.43; N, 4.50.

The compound was further characterised by forming the picrate which was recrystallised from ethanol as yellow leaflets, melting point 102–3° C.

*Analysis.*—Calculated for $C_{22}H_{22}N_4O_8Cl_2$ (percent): Cl, 13.10. Found (percent): Cl, 12.99.

EXAMPLE 2

The hydrochloride of N,N-bis(beta-hydroxyethyl)-1-methoxy-2-methyl-4-amino-naphthalene was prepared as described in Example 1.

A mixture of N,N-bis(beta-hydroxyethyl)-1-methoxy-2-methyl-4-amino-naphthalene hydrochloride (12.5 grams) and phosphorus tribromide (11.4 mls.) was heated on a steam bath under reflux for 30 minutes and worked up as described in Example 1. Evaporation of the benzene eluate gave a red oil (5 grams) which crystallised on standing. Recrystallisation from absolute methanol produced the product as white crystals, melting point 71–72° C.

Analysis.—Calculated for $C_{16}H_{19}NOBr_2$ (percent): C, 47.90; H, 4.77; Br, 39.84. Found (percent): C, 48.29; H, 4.64; Br, 39.56.

EXAMPLE 3

The hydrochloride of N,N-bis(beta-hydroxyethyl)-1-n-propoxy-2-methyl-4-amino-naphthalene was prepared by the procedure described in Example 1 for the 1-methoxy compound from 4-amino-1-n-propyl-2-methyl-naphthalene.

A mixture of N,N-bis(beta-hydroxyethyl)-1-n-propoxy-2-methyl-4-amino-naphthalene hydrochloride (7 grams) and phosphorus oxychloride (4.3 mls.) was heated on a steam bath under reflux for 90 minutes prior to working up as described in Example 1. Evaporation of the benzene eluate gave the product (5.5 grams) as a brown oil. It is N,N-bis(beta-chloroethyl)-1-n-propoxy-2-methyl-4-amino-naphthalene.

The picrate was obtained as yellow leaflets from ethanol, melting point 86–87° C.

Analysis.—Calculated for $C_{24}H_{26}N_4O_8Cl_2$ (percent): C, 50.62; H, 4.60; Cl, 12.46. Found (percent): C, 50.82; H, 4.94; Cl, 12.19.

EXAMPLE 4

The hydrochloride of N,N-bis(beta-hydroxypropyl)-1-methoxy-2-methyl-4-amino-naphthalene was prepared by the procedure described in Example 1 for the preparation of N,N-bis(beta-hydroxyethyl)-1-methoxy-2-methyl-4-amino-naphthalene by substituting a molar equivalent of 1-chloro-isopropyl alcohol for ethylene chlorohydrin.

A mixture of N,N-bis(beta-hydroxypropyl)-1-methoxy-2-methyl-4-amino-naphthalene hydrochloride (13.4 grams) and phosphorus oxychloride (11.0 mls.) was heated on a steam bath under reflux for 60 minutes prior to working up as described in Example 1. Evaporation of the benzene eluate gave the product (8.5 grams) as a red oil. It is N,N-bis(beta-chloropropyl)-1-methoxy-2-methyl-4-amino-naphthalene.

The red oil was converted into the picrate but this did not crystallise. The inability to obtain either the compound or its picrate in crystalline form is attributed to the presence of stereoisomers since two asymmetric carbon atoms are present in the molecule.

EXAMPLE 5

The hydrochloride of N,N-bis(gamma-hydroxypropyl)-1-methoxy-2-methyl-4-amino-naphthalene was prepared by the procedure described in Example 1 for the preparation of N,N-bis(beta-hydroxyethyl)-1-methoxy-2-methyl-4-amino-naphthalene by substituting a molar equivalent of 3-chloropropanol for ethylene chlorohydrin.

A mixture of N,N-bis(beta-hydroxypropyl)-1-methoxy-2-methyl-4-amino-naphthalene hydrochloride (3.4 grams) and phosphorus oxychloride (2.1 mls.) was heated in a boiling water bath under reflux for 30 minutes and worked up as described in Example 1. Evaporation of the benzene eluate gave the product as a brown oil (2.5 grams) which is N,N-bis(3-chloropropyl)-1-methoxy-2-methyl-4-amino-naphthalene.

The picrate of this brown oil was obtained as yellow crystals from ethanol having a melting point of 141–142° C.

Analysis.—Calculated for $C_{24}H_{26}N_4O_8Cl_2$ (percent): C, 50.62; H, 4.60; Cl, 12.46. Found (percent): C, 50.56; H, 4.64; Cl, 12.16.

The compounds of the present invention may conveniently be made available in the form of tablets or capsules containing a predetermined unit quantity of the tertiary alphanaphthylamine for oral administration. Such tablets may contain a binder and an excipient as additional ingredients thereof. Suitable excipients include maize starch, other forms of edible starch, and sugars such as lactose and dextrose. Suitable binders include methyl cellulose, gum acacia and sodium alginate. A lubricant such as stearic acid or magnesium stearate may also be present. To avoid risk of decomposition of the active ingredients it is preferred first to prepare granules of excipient and binder and these are mixed cold with the active ingredient and any required additional ingredients such as lubricant, the resulting composition precompressed, the precompressed product broken down into granules and then reformed into a tablet.

Capsules may contain a predetermined unit dose of an N-substituted 1-alkoxy-2-methyl-4-amino-naphthalene in accordance with the invention in powder or granular form enclosed within a water-soluble casing, such as a gelatine casing. The powder or granules may include a diluent such as lactose.

The compounds of the present invention may also be formulated with a cream base. Such base may be an ointment base of oleaginous or non-oleaginous nature, an oil-in-water or a water-in-oil emulsion. The ointment base may be a pharmaceutical grade of soft paraffin alone or together with lanolin, white beeswax, a vegetable oil or an ester of a long chain fatty acid with an alkanol such as butyl stearate or isopropyl myristate. The proportions may be as follows:

| | Percent by weight |
|---|---|
| Active ingredient | 1–5 |
| Isopropyl myristate | 15–30 |
| White beeswax | 5–10 |
| Anhydrous lanolin | 2–5 |
| Soft paraffin to 100. | |

An oil-in-water emulsion may be one in which an oleaginous base is dispersed in water or acceptable aqueous medium. The oleaginous base may contain any of the abovementioned ingredients. The aqueous phase of the emulsion may include one or more water-soluble polyhydric alcohols such as glycerine, sorbitol, polyethylene glycols or polypropylene glycols. The emulsifying agent present in such emulsions is usually an anionic emulsifying agent such as an alkali metal salt of a sulphated fatty alcohol, of an alkylated benzene or naphthalene sulphonic acid, of a di-alkyl ester of a sulphonated succinic acid or of an N-alkyltaurine.

A water-in-oil emulsion may be based upon any of the mixtures of ingredients used to formulate an oil-in-water emulsion using only sufficient water to ensure that it forms the disperse phase and employing a cationic or non-ionic type of emulsifying agent such as benzyl dimethyl stearyl ammonium chloride and bromide and the mono fatty acid esters of sorbitan.

All the above bases may include a preservative such as one or more lower alkyl esters of para-hydroxybenzoic acid.

Another form in which the compounds of the invention may be made available is as a suppository. Suitable bases in which to incorporate the active principle include (a) molten cocoa butter, (b) a molten mixture of the mono-, di- and tri-glycerides of saturated fatty acids having 12 to 18 carbon atoms and (c) a mixture of condensed branched chain fatty alcohols and a non-ionic emulsifying agent.

The following are typical compositions in accordance with the invention.

A tablet is made up from the following:

| | Mg. |
|---|---|
| Compounds of Example 1 | 250 |
| Lactose granules | 250 |

| | |
|---|---|
| Starch maize B.P. | 40 |
| Talc B.P.C. | 8 |
| Magnesium stearate | 2 |

This mixture is precompressed, broken down into granules and then tabletted. The lactose granules have the following composition: lactose B.P. 80% by weight, starch maize B.P. 9.6%, sucrose B.P. 9.6% and acacia B.P. 0.8%.

A water-in-oil emulsion is made from the following:

| | Percent |
|---|---|
| Product of Example 1 | 1–5 |
| Isopropyl myristate | 25 |
| Liquid anhydrous lanolin | 3 |
| White beeswax | 5 |
| Sorbitan sesquioleate | 4 |
| Sorbitan mono-oleate | 2 |
| Sorbitol syrup B.P.C. | 5 |
| Methyl para-hydroxybenzoate B.P.C. | 0.25 |
| Propyl para-hydroxybenzoate B.P.C. | 0.15 |
| Reodorant | 0.25 |
| Purified water | To 100 |

The third, fourth, fifth and sixth ingredients are melted together, the product of Example 1 and the reodorant are dissolved in the isopropyl myristate at a temperature not exceeding 35° C. and the hydroxybenzoates in the sorbitol syrup and water. The three mixtures are then homogenised as rapidly as possible and the mixture cooled.

An oil-in-water type cream is made from the following:

| | G. |
|---|---|
| Product of Example 1 | 2.00 |
| Isopropyl myristate B.P.C. | 25.00 |
| White soft paraffin B.P. | 5.00 |
| Liquid anhydrous lanolin | 3.00 |
| Emulsifying wax B.P. | 10.00 |
| Sorbitol syrup B.P.C. | 5.00 |
| Glycerin B.P. | 5.00 |
| Methyl hydroxy benzoate B.P.C. | 0.25 |
| Propyl hydroxy benzoate B.P.C. | 0.15 |
| Reodorant | 0.25 |
| Purified water B.P. | 44.35 |

The third, fourth and fifth ingredients are melted together and cooled to 60° C. The hydroxybenzoates are dissolved in the sorbitol syrup, glycerine and a part of the water. The product of Example 1 and the reodorant are dissolved in the isopropyl myristate at a temperature not exceeding 35° C. and mixed with the lanolin-containing mixture, then with the solution of the hydroxybenzoates and then with the remainder of the water, after which the mixture is cooled.

We claim:

1. A tertiary alpha-naphthylamine having the formula

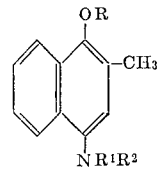

in which R is an alkyl group having one to six carbon atoms, and each of $R^1$ and $R^2$ is a haloalkyl group having the formula —$C_nH_{2n}X$ in which $n$ is an integer greater than 1 but less than 5 and X is selected from chlorine and bromine atoms and is a substituent on a carbon atom other than that which is linked to the nitrogen atom, with the proviso that X is the same for each of $R^1$ and $R^2$.

2. A tertiary alpha-naphthylamine as claimed in claim 1 in which said atom X is present in at least one of $R^1$ and $R^2$ in the beta-position with respect to the nitrogen atom.

3. A tertiary alpha-naphthylamine as claimed in claim 1 in which R is a methyl group.

4. The compound claimed in claim 1 in which R is methyl, $R^1$ is beta-chloroethyl and $R^2$ is beta-chloroethyl.

5. The compound claimed in claim 1 in which R is methyl, $R^1$ is beta-bromoethyl and $R^2$ is beta-bromoethyl.

6. The compound claimed in claim 1 in which R is n-propyl, $R^1$ is beta-chloroethyl and $R^2$ is beta-chloroethyl.

7. The compound claimed in claim 1 in which R is methyl, $R^1$ is beta-chloropropyl and $R^2$ is beta-chloropropyl.

8. The compound claimed in claim 1 in which R is methyl, $R^1$ is gamma-chloropropyl and $R^2$ is gamma-chloropropyl.

References Cited
UNITED STATES PATENTS 2,144,446  1/1939  Williams _____ 260—574X CHARLES B. PARKER, Primary Examiner C. F. WARREN, Assistant Examiner U.S. Cl. X.R.

424—330